Oct. 31, 1950 E. G. FAHLMAN ET AL 2,527,537
PISTON MOLD

Filed June 3, 1947 5 Sheets-Sheet 2

INVENTORS
Sidney W. Jackson
Everett G. Fahlman
BY
Evans + McCoy
ATTORNEYS

Oct. 31, 1950　　　E. G. FAHLMAN ET AL　　　2,527,537
PISTON MOLD

Filed June 3, 1947　　　　　　　　　　　　5 Sheets-Sheet 5

INVENTORS
Sidney W. Jackson
Everett G. Fahlman
BY
Evans + McCoy
ATTORNEYS

Patented Oct. 31, 1950

2,527,537

UNITED STATES PATENT OFFICE 2,527,537

PISTON MOLD

Everett G. Fahlman and Sidney W. Jackson, Medina, Ohio, assignors to The Permold Company, Medina, Ohio, a corporation of Ohio Application June 3, 1947, Serial No. 752,164

7 Claims. (Cl. 22—93)

This invention relates to molding machines and more particularly to machines for molding aluminum alloy pistons.

The invention has for its object to provide a machine by means of which the mold and core sections can be quickly and easily assembled for casting articles such as pistons and by which the core sections may be actuated to quickly release the casting.

More specifically it is the object of the invention to provide means for automatically and sequentially imparting movements to the core sections to collapse the core and free the casting therefrom.

With the above and other objects in view, the invention may be said to comprise the molding machine as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
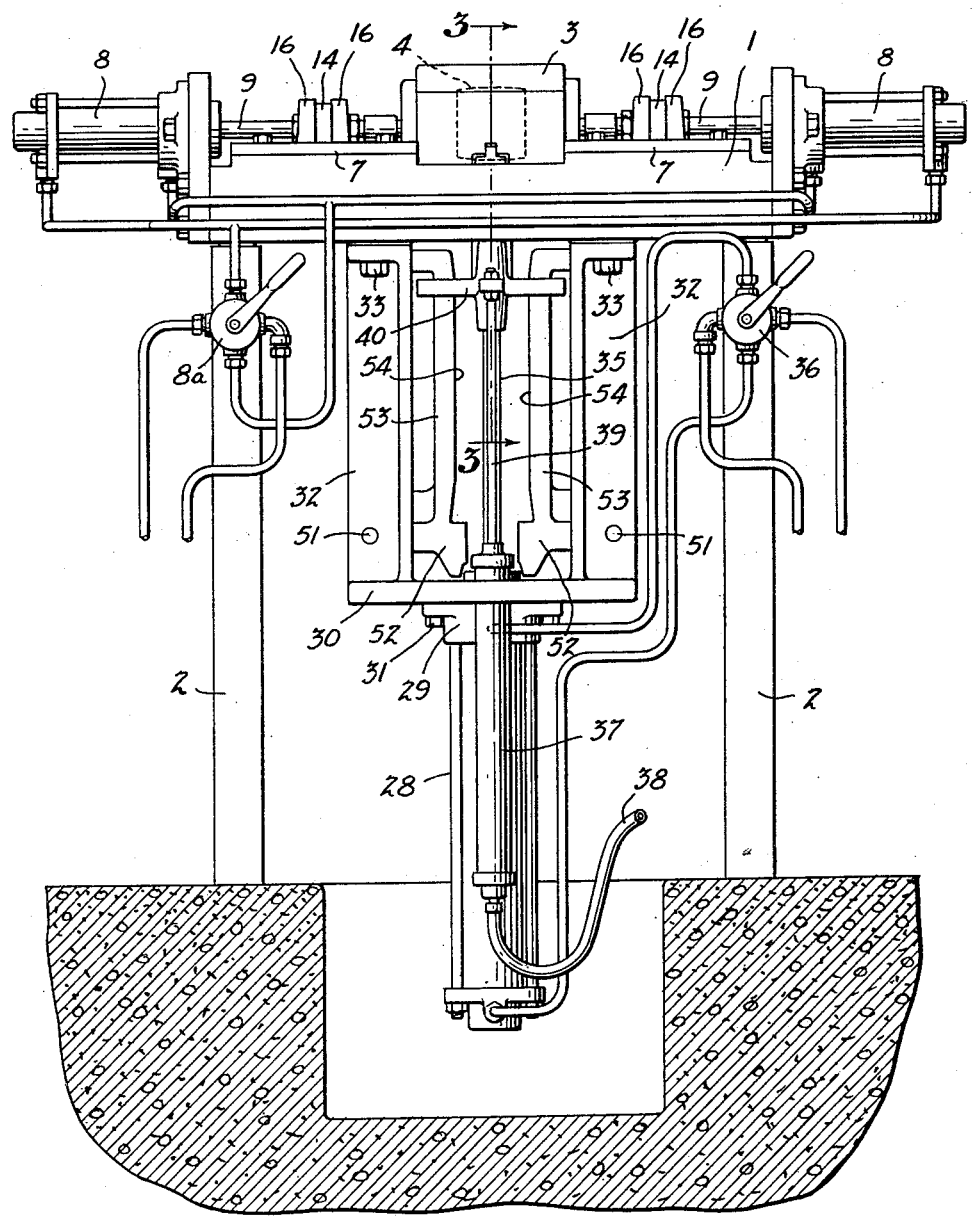
Figure 1 is a side elevation of a machine embodying the invention.

As shown in the accompanying drawings, the machine frame comprises a horizontal mold supporting bed or table 1 provided with suitable supporting legs 2. The mold mounted upon the bed 1 has two separable mold sections 3 which may be identical and which have opposed faces shaped to form a cup-shaped mold cavity 4 and pouring gates 5 when the sections are brought together. The mold sections 3 are mounted upon slides 6 that are adapted to move in ways 7 on the bed 1 by means of horizontally disposed cylinders 8 mounted at opposite ends of the bed 1. The cylinders 8 have pistons 9 that are attached at their inner ends to horizontally disposed wrist pin cores 10 that are slidable in the sections 3 and that project into the mold cavity 4.

The pistons 9 have threaded end portions 11 attached to the core pins 10 and inner and outer pairs of nuts 12 and 13 are mounted on the threaded portions 11 of the pistons and provide adjustable actuating collars thereon. Plates 14 provided with centrally disposed slots 15 that open to the lower edges of the plates to receive the pistons 9 fit between vertically disposed pairs of lugs 16 and 17 projecting upwardly from the slides 6 on opposite sides of each of the pistons 9. The plates 14 are positioned between the spaced nuts 12 and 13 which are adjusted to provide the desired amount of play between the pistons and slides.

The cylinders 8 are provided with the usual pressure connections for operating the pistons 9 either inwardly or outwardly, and these pressure connections are controlled by means of a conventional manually operable four way valve 89. The nuts 12 and 13 cooperate with the plate 14 to provide a lost motion connection between the piston 9 and the slides 6 so that when the pistons 9 are moved outwardly the core pins 10 are moved axially a distance sufficient to free them from the casting before the mold sections start to move. By adjusting the nuts 12 and 13, the extent of initial movement of the core pins 10 may be regulated and since the plates 15 can be readily lifted from between the lugs 16 and 17, the core pins can be removed entirely from the mold sections when desired to facilitate the replacement of core pins, for example, when a larger or smaller pin is required or when it is desired to clean the mold during operation.

The mold sections are centered by stops 18 with respect to an annular mold base member 19 mounted in the bed 1, in which the lower portions of the mold core fit. The mold core is a sectional core having side sections 20 which are attached to slides 21 mounted in ways 22 on the under side of the bed 1, the slides 21 having inner ends 23 extending through the wall of the mold base 19 and being attached to the side sections 20 of the core by means of bolts 24. The core has an axially movable central portion which may be formed in sections. As herein shown, the central portion of the core has an inner section 25 that fits between the inner faces of the core sections 20 and has opposite, upwardly tapering, side faces 26 that are disposed transversely to the inner faces of the core sections 20. The central portion of the core also includes outer sections 27 which fit against the tapering faces 26 of the inner section, the side sections 20 and the central sections 25 and 27 forming the main core and closing the opening in the base member 19.

A vertically disposed core actuating cylinder 28 is mounted directly beneath the mold cavity with its central axis in alinement with the central axis of the mold cavity. The cylinder 28 has a flanged head 29 that is secured to a rectangular horizontal plate 30 by means of bolts 31. The cylinder 28 is supported by the plate 30, which is in turn supported from the bed by means of four upwardly extending corner posts 32 that extend upwardly from the corners of the plate to the bed and are attached to the bed by suitable means such as bolts 33. The plate 30 is provided with a central aperture 34 to receive the piston 35 of the cylinder 28 which is attached at its upper end to the inner center section 25. The cylinder 28 is provided with the usual pressure connections for moving the piston 35 upwardly or downwardly, and these connections are controlled in the usual manner by means of a manually operable four way valve 36.

The plate 30 supports two vertically disposed cylinders 37 on opposite sides of the cylinder 28, and the lower ends of the fluid cylinders 37 are connected by means of a suitable hose 38 with a suitable source of pressure such as a pressure air line. The cylinders 37 serve to automatically move the core sections 27 into the mold in collapsed position prior to the movement of the center core section 26 into the mold. The cylinders 37 have pistons 39 which are connected at their upper ends to a crosshead 40 which is slidably mounted on two upright posts 41 secured at their upper ends to the bed 1 and fitting in openings in the plate 30. The crosshead 40 serves to support the outer sections 27 of the core center, the core sections 27 being supported by means of levers 42 connected to the crosshead 40 by means of horizontal pivots 43 on opposite sides of the axis of the mold cavity. The levers 42 have upwardly extending arms 44 that are attached to the core sections 27 by means of bolts 45 and downwardly extending arms 46 that slant inwardly toward the piston 35 and terminate at their lower ends in hooks 47 that are engaged by a collar 48 on the piston 35 to first rock the levers about their pivots 43 to move the sections 27 inwardly toward the central axis of the core, and then to move the crosshead 40 bodily to withdraw the sections 27 axially from the mold cavity.

The collar 48 and levers 42 provide a lost motion connection between the piston 35 and the core sections 27 which causes the central section 25 to be partially withdrawn from the mold before the levers 42 are engaged by the collar 48, so that the sections 27 will be first rocked inwardly to free them from the casting and then withdrawn bodily from the mold upon engagement of the collar 48 with the arms 46. Springs 49 are interposed between the arms 46 and crosshead 40 to normally hold the core sections 27 in upright position so that the sections 25 and 27 readily assume their proper positions in the mold cavity when the piston 35 is moved to its uppermost position by the cylinder 28.

Figure 8:
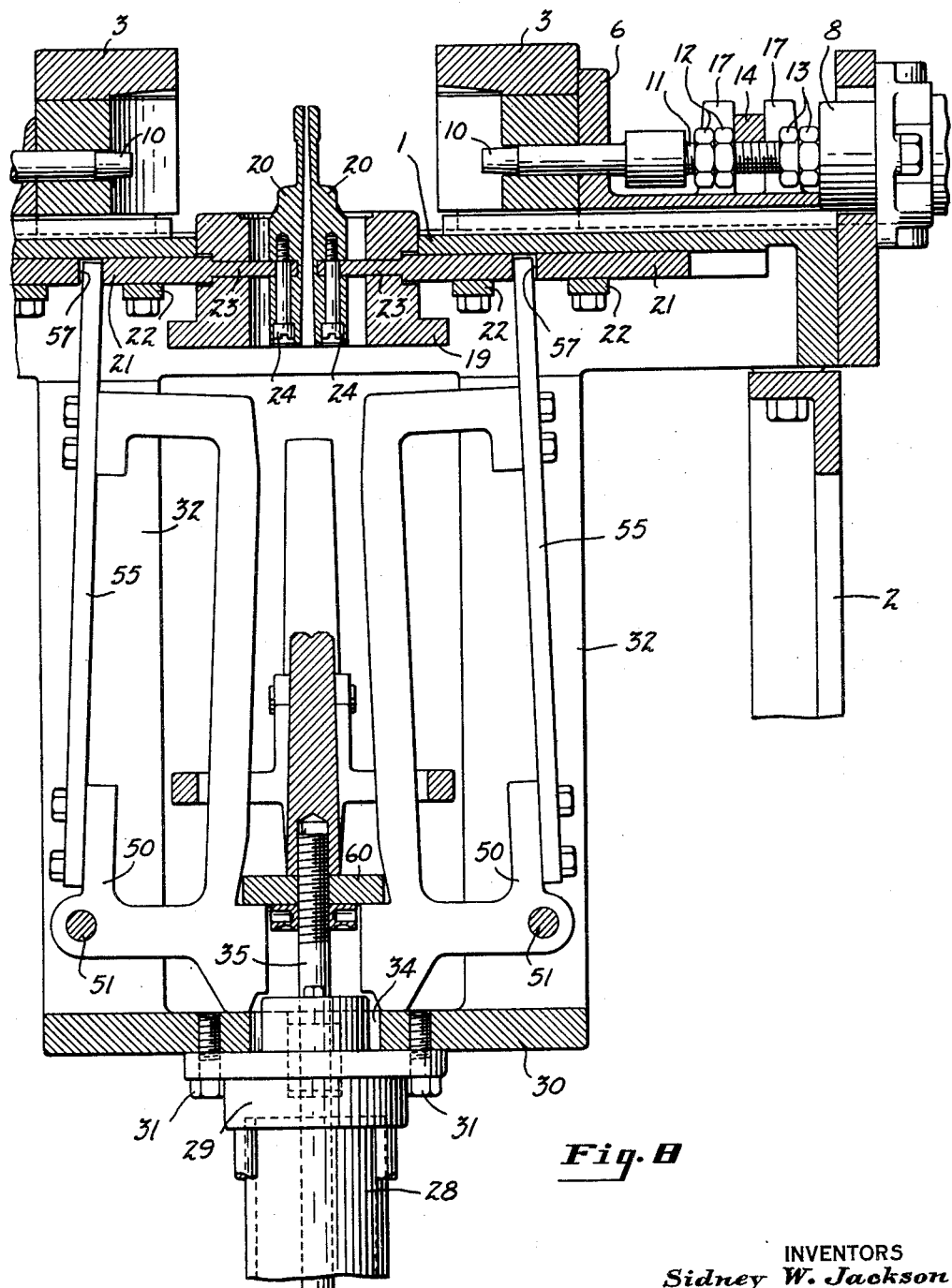
Fig. 8 is a section similar to Fig. 6, showing the mold in open position.

Two levers 50 are connected to the posts 32 adjacent the plate 30 by means of horizontal pivots 51. The levers 50 are disposed on opposite sides of the piston 35 and are preferably disposed to swing in a plane at right angles to the plane of movement of the levers 42. The levers 50 have arms 52 extending inwardly toward the piston 35 and upright cams 53 having vertical inner faces 54 may be integrally joined at their lower ends to the arms 52. Vertical bars 55 are attached by suitable means such as bolts 56 to the upper ends of the cams 53 and to the lever 50 adjacent the pivots 51. The bars 55 extend upwardly beyond the cams 53 into openings 57 formed in the slides 21. The inner faces of the cams 53 have inclined portions 58 at their upper ends, and the arms 52 are provided with shoulders 59 inwardly of the cams. An actuating plate 60 is attached to the piston 35 immediately beneath the core section 25, and this plate is of a width to pass with a slight clearance between the vertical faces 54 of the cams 53, the inclined portions 58 of the cam faces facilitating the entry of the plate 60 into the space between the cams. As the piston 35 approaches the lower end of its movement and after the core sections have been withdrawn from the mold, the plate 60 engages the shoulders 59 and rocks the levers 50 to move the bars 55 inwardly toward the axis of the mold cavity, the lower end portions of the cam faces being recessed at 61 immediately above the shoulders 59 to permit this rocking movement of the levers, and the recessed portions 61 being inclined so as to return the cam faces 54 to vertical position and to move the mold sections 20 to their operative position in the mold upon upward movement of the plate 60. The inward movement of the arms 55 moves the slides 21 inwardly to position the side core members 20 as shown in Fig. 8, the upper ends of the arms 55 having a loose fit in the openings 57 so that the arms can have a slight movement without shifting the core members 20.

Figure 2:
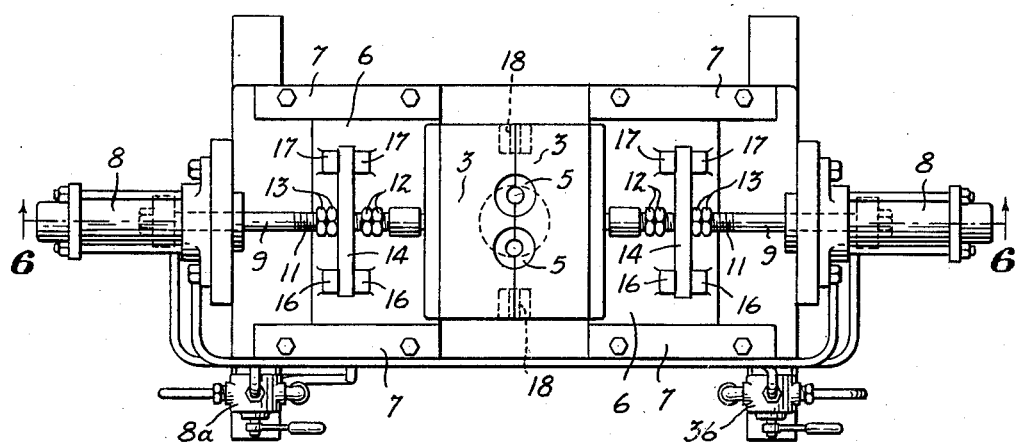
Fig. 2 is a top plan view of the machine.
Figure 4:
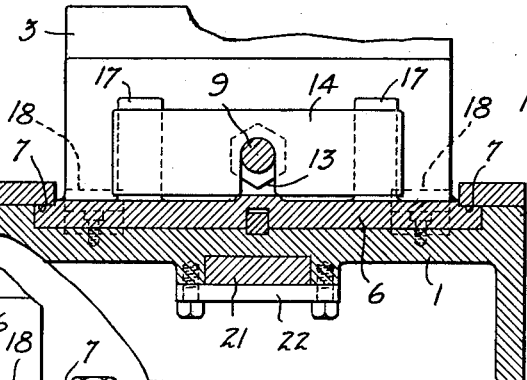
Fig. 4 is a transverse, vertical section taken on the broken line indicated at 4—4 in Fig. 6.
Figure 3:
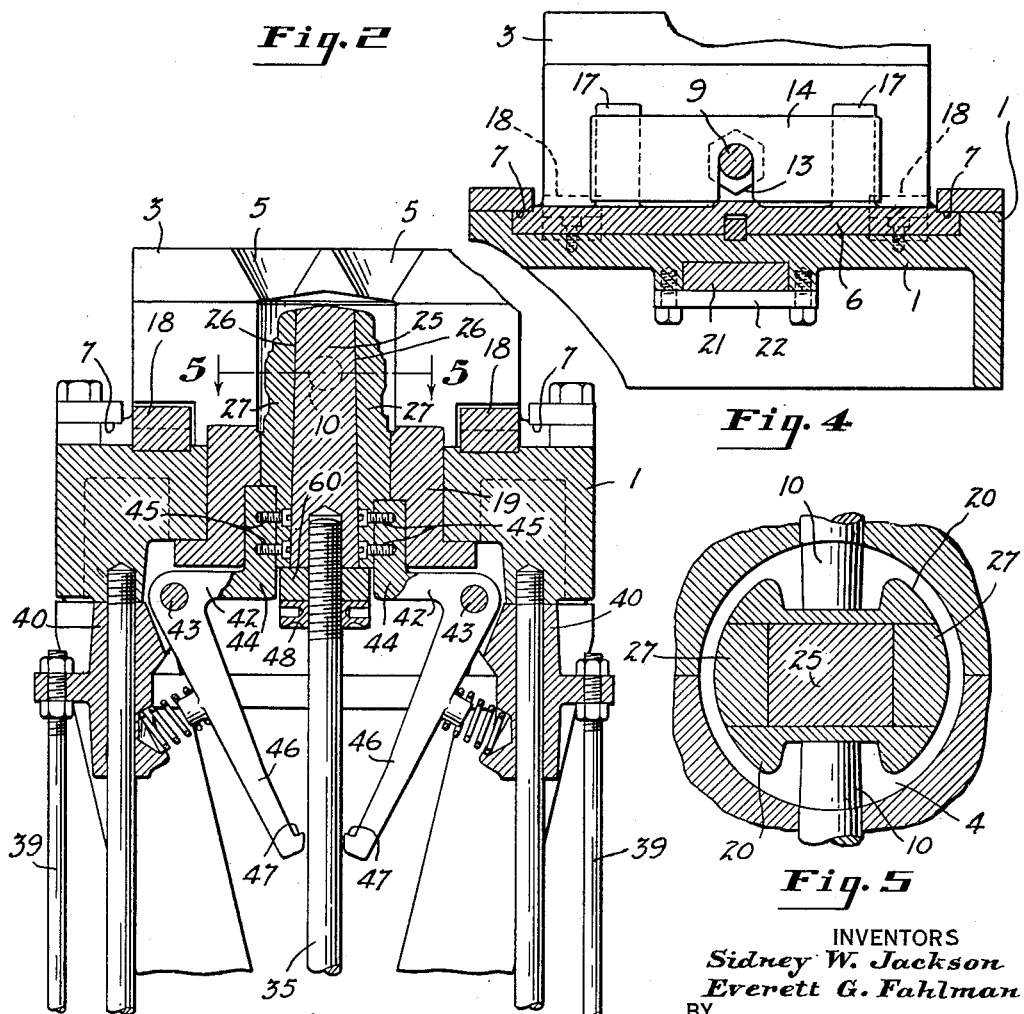
Fig. 3 is a fragmentary vertical section taken on the line indicated at 3—3 in Fig. 1.
Figure 5:
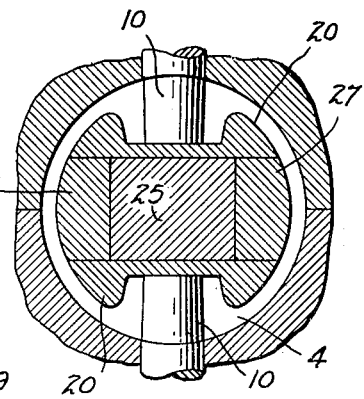
Fig. 5 is a horizontal section taken on the line indicated at 5—5 in Fig. 3.
Figure 6:
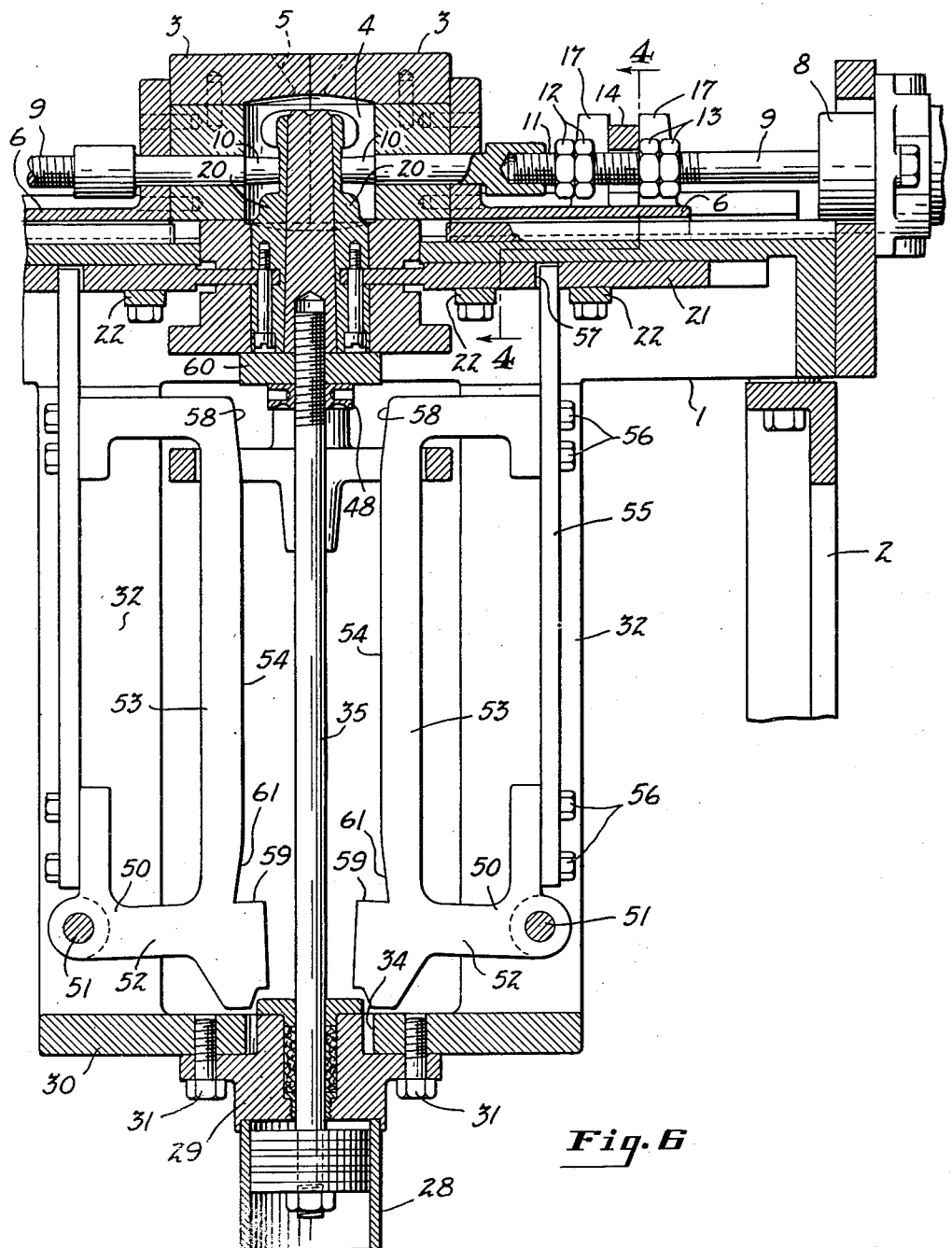
Fig. 6 is a sectional vertical section taken on the line indicated at 6—6 in Fig. 2.
Figure 7:
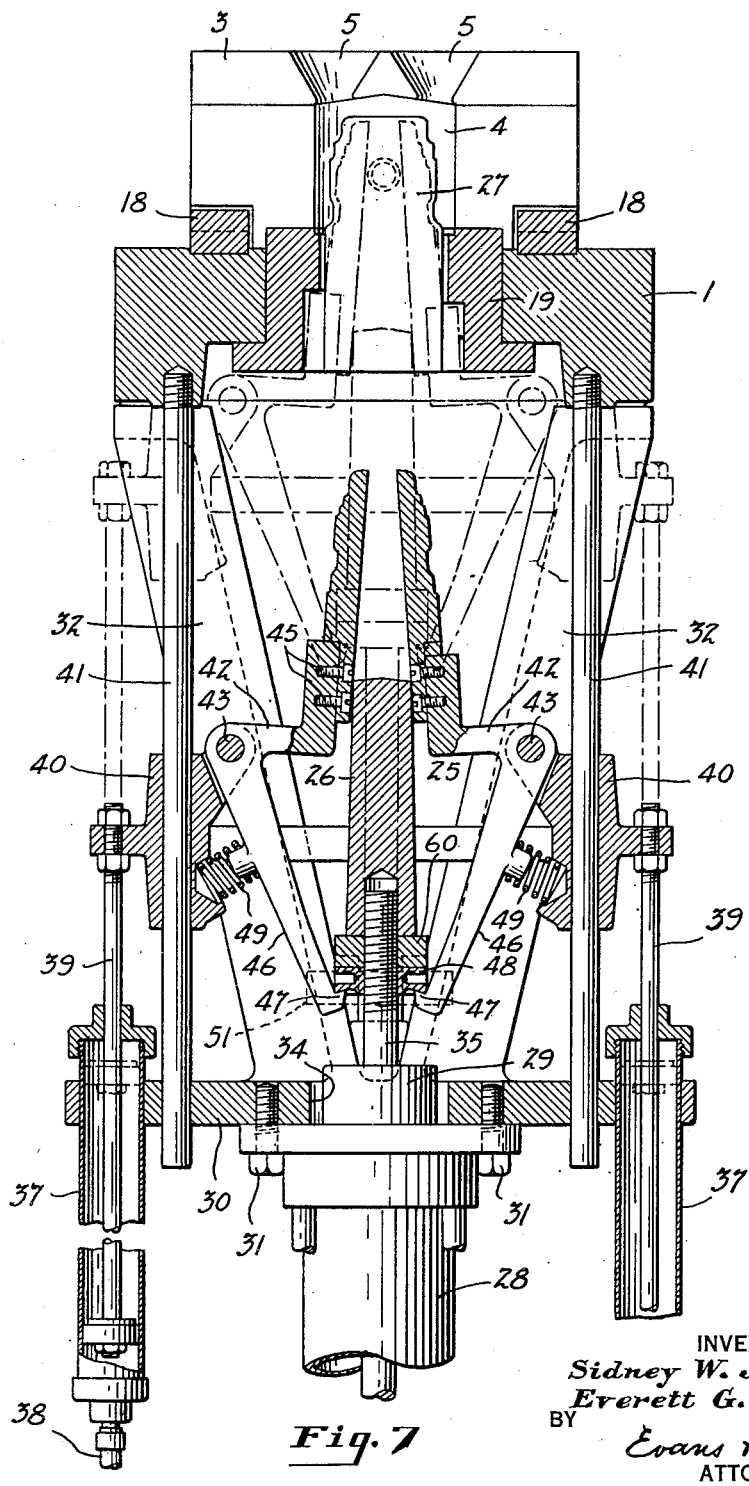
Fig. 7 is a section similar to Fig. 3, showing the core collapsed.

In the operation of the machine, the casting is poured with the mold assembled as shown in Figs. 2 and 3. After the casting is solidified, the core pins 10 are moved axially a distance sufficient to free them from the casting, whereupon the mold sections 3 are moved bodily away from the casting. The actuation of the piston 35 will withdraw the center sections 25 and 27 sequentially from the mold and, after withdrawal of these sections, the lost motion connection between the piston 35 and the side sections 20 provided by the levers 50 causes the sections 20 of the mold to be shifted into the space previously occupied by the center core sections, collapsing the core and freeing it from the casting.

In the operation of the machine the mold sections 3 may be withdrawn from the casting either prior to or after the mold core is collapsed by means of the cylinder 28.

It is to be understood that variations and modifications of the specific devices herein shown and described for purposes of illustration, may be made without departing from the spirit of the invention.

What we claim is:

1. In a molding machine having a frame, a mold mounted on said frame and comprising separable sections shaped to provide a downwardly opening mold cavity and a sectional core extending upwardly into said cavity, said core comprising side sections mounted for movement horizontally toward and away from the central axis of said cavity and central sections between said side sections mounted for movement axially of said cavity into and out of said mold cavity, said central sections comprising an inner longitudinally tapering section and outer sections engaging the tapering sides of said inner section, the combination therewith of a core actuating mechanism comprising a vertical cylinder beneath said core having a piston attached to said inner central section, a crosshead guided for vertical movement in the frame, pneumatic cushioning means for normally holding said crosshead in its uppermost position, a pair of levers connected to said crosshead upon opposite sides of said piston, each of said levers having an upwardly extending arm attached to one of said outer sections and an actuating arm extending inwardly toward said piston, a pair of levers pivoted to the frame below said crosshead and at opposite sides of said piston each having an upwardly extending arm connected to one of said side sections and an actuating arm extending inwardly toward said piston, and actuating means moving with the piston and engageable, first with the crosshead levers to rock said outer sections toward said central axis and to shift the crosshead to withdraw the outer central sections with the inner section, and subsequently with the frame levers to shift said side sections toward the central axis of the mold cavity.

2. In a molding machine having a frame, separable mold sections mounted on the frame and forming a mold cavity and a sectional core comprising side sections mounted for movement in the mold cavity toward or away from the central axis of the mold cavity and a central section between said side sections and movable axially out of the mold, the combination therewith of a core actuating mechanism comprising a vertically disposed cylinder beneath the mold having a piston connected to said center section, a horizontally disposed actuating plate attached to said piston, and two levers pivoted to the frame below said mold and at opposite sides of said piston, each lever having an upwardly extending arm operably connected to one of said side sections of the core and an arm extending inwardly toward said piston, said inwardly extending arms projecting into the path of movement of said actuating plate and positioned to be engaged by said member near the lower end of the stroke of said piston and after removal of said center section to move said side sections inwardly, said upwardly extending arms having portions adjacent their lower ends overlying said actuating plate when said piston is at the lower end of its stroke whereby said levers are actuated to move said side sections to their outermost position upon upward movement of said piston.

3. In a molding machine having a frame, separable mold sections mounted on said frame and forming a mold cavity and a sectional core comprising side sections mounted for movement toward or away from the axis of the mold cavity and a central section mounted for movement axially into and out of the mold, the combination therewith of a core actuating mechanism comprising a part attached to said center section and mounted for movement in said frame axially of said mold cavity, actuating levers pivoted to the frame on opposite sides of said axis to swing about axes transverse to said axis and operably connected to said side sections to move the same toward and away from said axis, each lever having an arm provided with an inner face portion between the lever pivot and the mold which is disposed substantially parallel to said axis when said arms are in their outermost positions with respect to said axis and an arm more remote from the mold that projects inwardly past said inner face portion, the first mentioned arms having face portions adjacent said inwardly extending arms that converge toward said parallel face portions, and a member carried by said axially movable part that passes with small clearance between said parallel inner face portions and that engages the inwardly projecting arms to actuate the levers in a direction to move said side sections toward said axis and that engages said converging face portions to actuate the levers in a direction to return said side sections to their outermost positions.

4. A molding machine having a frame, separable mold sections mounted on the frame and shaped to provide a mold cavity, a sectional core comprising a pair of side sections slidably mounted for movement toward and away from one another in the mold cavity, two relatively movable members mounted in the frame for linear movement toward and away from said mold cavity, center core sections respectively carried by said members and movable with said members from positions within said cavity between said side core sections to positions entirely outside said mold cavity, means for actuating one of said movable members in a direction to withdraw the core section movable therewith from the mold, a lost motion connection between said movable members for imparting a withdrawing movement to the second of said members after a predetermined movement of the first, an actuating member carried by one of said movable members, and a pair of levers respectively connected to said pair of side sections to move the same toward each other, said pair of levers having arms respectively disposed in the path of said actuating member and positioned to be engaged by said actuating member after said center core sections have been completely withdraw from the mold cavity for moving said pair of side sections toward each other.

5. A molding machine such as set forth in claim 4 in which each of the core side section actuating levers is pivoted to swing about an axis transverse to the line of movement of the member which actuates it and has an elongated arm extending in the direction of said line of movement and connected to a side core section and an arm extending laterally of said line of movement into the path of said actuating member.

6. In a molding machine having a frame and a mold carried by the frame that comprises separable sections forming a mold cavity and a sectional core projecting into said mold cavity, said core comprising a removable section guided in said frame for linear movement into and out of said mold cavity and a mold carried section slidably mounted for movement within the mold cavity in translation and normal to the linear movement of said removable section into and out of the space occupied by the removable section when the mold is assembled, the combination therewith of a core actuating mechanism comprising a lever pivoted to the frame laterally of the line of movement of said removable section to swing about an axis transverse to said line of movement, said lever having one arm extending longitudinally of said line of movement of the removable core section and operably connected to said mold carried core section to move the same and an arm extending laterally toward said line of movement, and an actuating member movable with said removable core section and engageable with said laterally extending arm after withdrawal of said removable core section to rock said lever and move said mold carried section in translation laterally within the mold cavity into the space formerly occupied by the removable section and movable with said longitudinally extending arm during return movement of the removable section to move the mold carried section out of the path of the removable section.

7. A molding machine as set forth in claim 6 in which the longitudinally extending arm has a cam face provided with an inclined portion adjacent the laterally extending arm with which the actuating member engages upon return movement of the removable section, and an elongated portion which is closely adjacent the path of movement of the actuating member to prevent inward movement of the longitudinally extending arm during movement of the removable section into and out of the mold cavity.

EVERETT G. FAHLMAN.
SIDNEY W. JACKSON.

REFERENCES CITED

The following references are of record in the file of this patent:

UNITED STATES PATENTS

| Number | Name | Date |
| --- | --- | --- |
| 1,993,439 | Flammang et al. | Mar. 5, 1935 |
| 2,070,649 | Cox et al. | Feb. 16, 1937 |
| 2,129,351 | Flammang et al. | Sept. 6, 1938 |
| 2,286,994 | Nocar | June 16, 1942 |